United States Patent [19]

Maruhashi et al.

[11] Patent Number: 5,106,890
[45] Date of Patent: Apr. 21, 1992

[54] POLYVINYL ALCOHOL-STARCH FILM

[75] Inventors: Motokazu Maruhashi, Kasatsu; Hiroshi Tokonami, Itami, both of Japan

[73] Assignee: Nippon Gohsei Kagaku Kogyo Kabushiki Kaisha, Osaka, Japan

[21] Appl. No.: 444,914

[22] Filed: Dec. 4, 1989

[30] Foreign Application Priority Data

Dec. 5, 1988 [JP] Japan .................................. 63-307225
Mar. 28, 1989 [JP] Japan .................................. 63-77023

[51] Int. Cl.$^5$ .............................................. C08J 7/00
[52] U.S. Cl. ...................................... 524/47; 428/424.6
[58] Field of Search ....................... 428/424.6; 524/47

[56] References Cited

U.S. PATENT DOCUMENTS 3,949,145 4/1976 Otey et al. ........................ 428/424.6

Primary Examiner—Edith L. Buffalow
Attorney, Agent, or Firm—Armstrong, Nikaido, Marmelstein, Kubovcik & Murray

[57] ABSTRACT

A polyvinyl alcohol-starch film which is prepared from a composition comprising a polyvinyl alcohol having a degree of hydrolysis of at least 93% by mole and a starch, the film being at least uniaxially stretched. The film of the present invention is excellent in water resistance, and moreover in degradable property.

6 Claims, No Drawings

POLYVINYL ALCOHOL-STARCH FILM

BACKGROUND OF THE INVENTION

The present invention relates to a film prepared from a composition comprising a polyvinyl alcohol and a starch or a crosslinking agent in addition to the above two components, and more particularly to a polyvinyl alcohol-starch film having an excellent water resistance and easily degradable due to mechanical actions or microorganisms living in the soil.

A composition comprising a polyvinyl alcohol and a starch has been widely used in various field. For instance, the composition is used as adhesives, sizing agents for fibers or textiles, or formed into molded articles such as films or sheets, and the like. As to such conventional uses, there are many cases that the property of being capable of solubilizing in water is one character of the polyvinyl alcohol and the starch which is utilized. That is, the character, the solubility in water is effectively utilized in the respects of, for instance, the desizing after sizing warps when using the composition as the sizing agent, the possibility that the film is thrown away into a flush toilet, such as films for sanitary napkin when using the composition as the film, and the like.

However, when above-mentioned polyvinyl alcohol-starch film (the film prepared from the composition comprising the polyvinyl alcohol and the starch) is used as materials suitable for agricultural uses, for instance, films for protecting a root which is suitable for use of protecting a root when transporting or transplanting plants, films (multifilm) for removing weeds which is suitable for use of preventing the propagation of weeds by covering the surface of cultivated fields with the film to intercept the sunlight, tapes for binding into sheaves which is suitable for use of binding rice, barley or wheat plants into sheaves after reaping them, and the like, the poor water resistance of the polyvinyl alcohol-starch film limits the increase of its use.

On the other hand, it has been reported that the polyvinyl alcohol-starch film is decomposed by microorganisms in the soil. Accordingly, if the polyvinyl alcohol-starch film can be used as the materials suitable for agricultural uses as mentioned above, the environmental pollution is not caused, that is, it can be said that such a film is industrially remarkably useful.

When using the polyvinyl alcohol-starch film in the field requiring the water resistance, e.g., as the materials suitable for agricultural uses, the film is forced to be given the water resistance by a hydrophobic resin, for instance, a solution of a vinylidene chloride polymer is coated on the film surface or an other film such as polyethylene film is laminated on the film, and the like.

An object of the present invention is to provide a polyvinyl alcohol-starch film having excellent water resistance and easily degradable due to mechanical actions or microorganisms in the soil.

A further object of the present invention is to provide a use of the above-mentioned film as a material suitable for agricultural uses.

These and other objects of the present invention will become apparent from the description hereinafter.

SUMMARY OF THE INVENTION

It has now been found that a polyvinyl alcohol-starch film which is prepared from a composition comprising a polyvinyl alcohol having a degree of hydrolysis of at least 93% by mole and a starch or comprising a crosslinking agent in addition to the above-mentioned two components, and which is at least uniaxially stretched can attain the above-mentioned objects.

In accordance with the present invention, there is provided a polyvinyl alcohol-starch film which is prepared from a composition comprising a polyvinyl alcohol having a degree of hydrolysis of at least 93% by mole and a starch, the film being at least uniaxially stretched.

Also, in accordance with the present invention, there is provided a use of the above-mentioned film as a material suitable for an agricultural use.

DETAILED DESCRIPTION

The present invention can provide films having the improved water resistance and having the desired degradable property according to the proposal, which is easily controlled, by the use of the polyvinyl alcohol having the degree of hydrolysis within the specified range and by the easy operation that the film is at least uniaxially stretched.

For instance, when the film is used as the materials suitable for agricultural uses, the film properties can be maintained at the desired level for a long period of time without impairing them by rainwater or underground water. On the other hand, the film is naturally broken down after the lapse of a certain period of time or the film is easily broken down by mechanical operation, e.g., using a tractor, and moreover even if the broken film is allowed to stand on a field as it is, the environmental pollution is not caused, because the decomposition of the film progressed by microorganisms in the soil.

In the present invention, the polyvinyl alcohol must have a degree of hydrolysis of at least 93% by mole, and preferably has a degree of hydrolysis of at least 95% by mole. When the degree of hydrolysis is less than 93% by mole, the water resistance is poor.

The degree of polymerization of the polyvinyl alcohol is from 300 to 10,000, preferably from about 1,000 to 6,000.

As the polyvinyl alcohol used in the present invention, there can be used not only polyvinyl alcohols obtained by hydrolyzing polyvinyl acetate but also hydrolyzed copolymers of vinyl acetate with an another copolymerizable monomer therewith (for instance, an olefin such as ethylene, propylene, butene, α-dodecene or α-octadecene, an unsaturated carboxylic acid such as acrylic acid, crotonic acid, maleic acid or itaconic acid, or its alkyl ester, salt, amide or nitrile, an unsaturated sulfonic acid, and the like) and modified polyvinyl alcohols, e.g., acetalized polyvinyl alcohol or polyvinyl alcohol copolymers. Examples of the starches used in the present invention are as follows:

(1) Raw starch: corn starch, potato starch, sweet potato starch, wheat starch, cassava starch, sago starch, tapioca starch, sorghum starch, rice starch, starchs of pulse, Kudzu starch, bracken starch, Indian lotus starch, water chestnuts starch, and the like (2) Modified starch:
   (i) Physically modified starch: α-starch (pregelatinized starch), fractionated amylose, a starch treated with moist heat, and the like
   (ii) Modified starch with an enzyme: dextrin (which is made by hydrolysis or enzymolysis of starch, amylose, and the like (iii) Modified starch by chemical decomposition: a starch treated with an acid, an oxidized starch such as a starch oxidized by hypochlorous acid, dialdehyde starch, and the like (iv) Derivatives of chemically modified starch:
(a) Esterificated starch: starch esterificated with acetic acid (starch acetate), starch succinate, starch nitrate, starch phosphate, starch ureaphosphate, starch xanthate, starch acetoacetate, and the like
(b) Etherificated starch: starch allyl ether, starch methyl ether, starch carboxymethyl ether, starch carboxyethyl ether, starch hydroxyethyl ether, starch hydroxypropyl ether, and the like
(c) Cationic starch: a reaction product of a starch and 2-diethylaminoethyl chloride (a tertiary amine), a reaction product of a starch and 2,3-epoxypropyltrimethylammonium chloride (a quaternary ammonium salt), and the like
(d) Crosslinked starch: starch crosslinked with formaldehyde, starch crosslinked with epichlorohydrine, starch crosslinked with phosphoric acid, starch crosslinked with acrolein, and the like The starches used in the present invention are not limited thereto.

Among the starches as mentioned above, there are preferably used the modified starches such as the physically modified starches, the modified starches with the enzyme, the modified starches by chemical decomposition and the derivatives of the chemically modified starches as the component capable of giving the high water resistance to the film. Especially, the derivatives of the chemically modified starches are advantageously used.

The amounts of the polyvinyl alcohol and the starch are not particularly limited and they can be used in any amounts. From the viewpoint of the balance between the water resistance and the degradable property, it is preferable that the weight ratio of the polyvinyl alcohol/the starch is from 75/25 to 1/99, more preferably from 70/30 to 5/95, especially from 70/30 to 10/90.

In the present invention, in order to further improve the water resistance of the film, it is possible to admix the crosslinking agent with the two components mentioned above. Any compounds can be used as the crosslinking agent in the present invention so long as the compound can react with any reactive groups in the polyvinyl alcohol and the starch to intermolecularly form a crosslinked structure. Generally, there are used compounds having a polyfunctional group, capable of reacting with hydroxyl groups in the polyvinyl alcohol and the starch.

Examples of the crosslinking agents used in the present invention are as follows:

(1) Polyisocyanate compounds: tolylene diisocyanate, hydrogenated tolylene diisocyanate, an adduct of trimethylol propane and tolylene diisocyanate, triphenylmethane triisocyanate, methylenebis(4-phenylmethane)triisocyanate, isophorone diisocyanate, their reaction products with ketoxime or phenol, and the like (2) Polyaldehydes: glyoxal, succindialdehyde, malonaldehyde, maleic dialdehyde, phthalic dialdehyde, glutaric aldehyde, adipaldehyde, and the like (3) Polyepoxy compounds: ethylene glycol diglycidyl ether, polyethylene glycol diglycidyl ether, glycerol diglycidyl ether, glycerol triglycidyl ether, 1,6-hexanediol diglycidyl ether, trimethylolpropane triglycidyl ether, diglycidyl aniline, diglycidyl amine, and the like (4) Polyamine compounds: urea, melamine, methylol urea, methylol melamine, hexamethylenediamine, triethanol amine, and the like (5) Compounds capable of producing a radical: hydrogen peroxide, potassium peroxodisulfate, ammonium persulfate, benzoyl peroxide, succinic acid peroxide, t-butylperoxy maleate, benzoin alkyl ethers such as t-butylhydroperoxidebenzoin methyl ether, benzoin ethyl ether and benzoin isopropyl ether, organic sulfer compounds such as dibutyl sulfide, benzyl sulfide and decylphenyl sulfide, a diazonium salt and a triazonium salt, their double salt with zinc chloride or its condensation product, azobisisobutyronitrile, 2,2'-azobis(2-amidinopropane)dihydrochloride, a dye such as methylene blue or a combination of p-toluenesulfonate ion therewith, a pyrylium salt, a thiapyrylium salt, ammonium dichromate, acetophenone, benzophenone, benzil, phenanthrene, thioxanthone, dichloropropyl phenyl ketone, anthraquinone, 2-chloroanthraquinone, 2-bromoanthraquinone, sodium anthraquinone-$\beta$-sulfonate, 1,5-dinitroanthroquinone, 1,2-benzanthraquinone, phenanthrenequinone, 5-benzoylacetonaphthene, 5-nitroacetonaphthene, 1,4-naphthoquinone, 1,8-phthaloylnaphthalene, 2-nitrofluorene, p-nitroaniline, picramide, and the like (6) Oxidizing agent: potassium dichromate, ammonium dichromate, calsium perchlorate, and the like (7) Polymerizable monomer: 2-hydroxyethyl acrylate, 2-hydroxyethyl methacrylate, 2-hydroxypropyl acrylate, 2-hydroxypropyl methacrylate, N-vinylpyrrolidone, 2-hydroxyethylacryloyl phosphate, acrylamide, methacrylamide, N-methylol acrylamide, N-methylol methacrylamide, N-methoxymethyl acrylamide, N-ethoxymethyl acrylamide, ethylene glycol monoacrylate, dipropylene glycol monoacrylate, N,N-dimethylaminoethyl acrylate, styrene, vinyl toluene, monochlorostyrene, diallyl phthalate, vinyl acetate, glycidyl methacrylate, and the like. (8) Salts of polyvalent metal: a chloride, bromide, nitrate, sulfate or acetate with a polyvalent metal such as aluminum, iron, copper, zinc, tin, titanium, nickel, antimony, magnesium, vanadium, chromium or zirconium, concretely, a cupric chloride, aluminum chloride. ferric chloride, stannic chloride, zinc chloride, nickel (II) chloride, magnesium chloride, aluminum sulfate, cupric acetate, chromium acetate, and the like. The crosslinking agents are not limited thereto The amount of the crosslinking agent is preferably 0.1 to 50 parts by weight, more preferably from 0.5 to 30 parts by weight, based on 100 parts by weight of the polyvinyl alcohol and the starch. When the amount of the crosslinking agent is more than 0.1 part by weight based on 100 parts by weight of the polyvinyl alcohol and the starch, the property for improving the water resistance of the film can be remarkably effected. On the other hand, the amount of the crosslinking agent is more than 50 parts by weight, the film becomes brittle.

The composition as mentioned above may include, if necessary, plasticizers such as glycerol, ethylene glycol, propylene glycol, trimethylol propane and polyethylene glycol, an inorganic fine powder such as silica, calcium carbonate and clay (kaolin), additives usually added to molded articles such as a coloring agent, a surfactant, an antioxidant, a water proofing agent, an enzyme, a fertilizer and a pesticide and a germicide, and the like. Further, other water-soluble resin may be suitably added to the composition.

When forming the film of the invention, any methods such as melt molding, e.g., extrusion or tubular film process, and film casting are applicable. Usually, the film is prepared by film casting. When forming by the film casting, known methods such as a method using a rotating drum and a method using an endless belt are applicable.

For instance, in the invention, an aqueous solution containing the composition comprising the polyvinyl alcohol and the starch or the composition comprising the polyvinyl alcohol, the starch and the crosslinking agent, the aqueous solution usually having a concentration of the polyvinyl alcohol and the starch of about 10 to 40% by weight, is subjected to film casting. It is usual that the film casting is conducted while maintaining the aqueous solution at a temperature of about 60° to 95° C., and then the formed film is dried at a temperature of about 60° to 100° C.

When conducting melt-molding, the composition comprising the polyvinyl alcohol and the starch, or comprising the above two components and the crosslinking agent is melted at a temperature of 150° to 250° C.

In the present invention, it is essential that the film is at least uniaxially stretched. The stretching is conducted while drying or after drying the non-stretched film. The water content of the film during stretching is controlled according to a stretching ratio of the film. Any stretching methods such as a method using a roll and a method using a tenter are applicable.

The film is stretched at least uniaxially in a stretching ratio of not less than 1.2, preferably from 1.2 to 6. When the stretching ratio is less than 1.2, the water resistance is not given to the film. When biaxially stretching the film, it is practical that the stretching ratio is from 1.2 to 3 in machine direction, and from 1.2 to 3 in transverse direction. In such a case, the film can be stretched simultaneously in machine direction and transverse direction. Also the film can be stretched in one direction and subsequently stretched in another direction.

The stretched film is subjected to a post treatment such as heat treatment or control of water content in usual manners. It is suitable that the heat treatment is conducted at a temperature of about 130° to 250° C. for several seconds to several minutes while tensing the film. After heat treatment, usually, the water content of the film is suitably adjusted in order to improve the dimensional stability of the film.

Thus obtained stretched film can be put on the practical use as it is. If necessary, any post treatment such as a treatment wherein the film is acetalized or a treatment wherein the film is coated or laminated with a hydrophobic resin can be conducted.

The thickness of the film of the invention is not particularly limited. Usually, the thickness is from about 10 to 80 μm. Moreover, in the invention, a thickness of about 100 to 200 μm can be adopted. The film of the invention contains not only the so-called films (usually having a thickness of about 10 to 80 μm) but also the so-called sheets (usually having a thickness of about 100 to 200 μm), and moreover the processed goods from the film or sheet such as taps, containers and vessels.

Not only is the film of the invention suitable for the above-mentioned agricultural uses such as films for protecting a root, films for removing weeds, binding taps and films for sowing seed but also the films are used as films, bags, containers or vessels for wrapping or packaging foods or textiles.

The stretched film of the invention, prepared from the composition comprising the polyvinyl alcohol and the starch, and moreover the crosslinking agent can be remarkably improved the water resistance by the stretching operation, and further by the use of the crosslinking agent.

The present invention is more specifically described and explained by means of the following Examples in which all per cents and parts are by weight unless otherwise noted. It is to be understood that the present invention is not limited to the Examples, and various changes and modifications may be made in the invention without departing from the spirit and scope thereof.

EXAMPLES 1-9 AND COMPARATIVE EXAMPLES 1 AND 2

A polyethylene terephthalate film was attached to a hot plate with a temperature of 50° to 60° C., on which an aqueous solution (concentration: 10%) of a composition of a polyvinyl alcohol and a starch shown in Table 1 was coated by using an applicator, and the film dried at 90° C. for 5 minutes to give a film with a thickness of 50 μm. After peeling off from the polyethylene terephthalate film, the obtained film was uniaxially stretched at 160° C. under a condition that the water content was 10%. When biaxially stretching the film, the film was stretched in one direction and then stretched in another direction in the same condition as above. The stretched film was subjected to heat treatment at 160° C. for one minute to give a film having a thickness of 40 μm.

As to the film (sample), the strength, swelling ratio in water and wet strength were measured by the following methods. The results are shown in Table 1.

Strength After the sample is adjusted to 65% RH at 20° C., the tensile strength at break is measured by using an autograph (the tensile speed: 40 mm/minute, a length of the sample: 20 mm)

Ratio of swelling by water: After dipping the sample in water with a temperature of 20° C. for 5 minutes, the length and width of the dipped sample are measured. A ratio of the measured size to the original size is shown in Table 1.

Wet strength: After the sample is dipped in water having a temperature of 20° C. for 5 minute, the tensile strength at break is measured by using an autograph (the tensile speed: 40 mm/minute, the length of the sample: 20 mm)

After subjecting to breaking test of the film, the film state was observed and the strength was measured in the same manner as above. The results are shown in Table 1.

Film state: [Estimation]
A: It can be confirmed with the naked eye that the film is broken down.
B: The shape of the film is maintained but it is easily broken down by crumpleing up.

The breaking test was conducted by using a sunshine weathermeter made by Suga Shikenki Kabushiki Kaisha.

Test condition: Temperature: 50° C. One cycle: water is sprayed for 12 minutes and light is irradiated for 48 minutes. In the breaking test, 110 cycles are repeated

TABLE 1

| Ex. No. | Composition | | | |
|---|---|---|---|---|
| | Polyvinyl alcohol | | Starch | Amount of PVA/Starch (by weight) |
| | Degree of Polymerization | Degree of hydrolysis (% by mole) | | |
| 1 | 1,700 | 99 | Starch urea-phosphate NYLGAMA-85*[1] | 30/70 |
| 2 | 1,000 | 98 | Starch acetate KOFILM 80*[2] | 40/60 |
| 3 | 1,500 | 99 | Oxidized starch Nisshoku MS-3800*[3] | 50/50 |
| 4 | 2,000 | 99 | Corn starch | 40/60 |
| 5 | 4,000 | 97 | Starch hydroxyalkyl ether PIO starch*[4] | 10/90 |
| 6 | 1,700 | 95 | Cationic starch EXCELL A-2*[5] | 30/70 |
| 7 | 500 | 98 | NYLGAMA-85 | 70/30 |
| 8 | 1,700 | 99 | KOFILM 80 | 50/50 |
| 9 | 2,000 | 98 | EXCELL A-2 | 60/40 |
| Com. Ex. 1 | 1,700 | 88 | NYLGAMA-85 | 30/70 |
| Com. Ex. 2 | 1,700 | 99 | NYLGAMA-85 | 30/70 |

| Ex. No. | Film property | | | | | Film property after breaking test | |
|---|---|---|---|---|---|---|---|
| | Stretching ratio | | Strength $(kg/cm^2)$ | Ratio of swelling by water (times) | Wet strength $(kg/cm^2)$ | Film state | Strength $(kg/cm^2)$ |
| | Machine direction | Transverse direction | | | | | |
| 1 | 1.5 | — | 430 | 1.1> | 300 | A | 0 |
| 2 | 2.0 | — | 390 | 1.1> | 320 | A | 0 |
| 3 | 1.4 | — | 360 | 1.1> | 230 | A | 20 |
| 4 | 1.5 | — | 410 | 1.1> | 160 | A to B | 40 |
| 5 | 1.3 | — | 210 | 1.1> | 150 | A | 0 |
| 6 | 1.7 | — | 410 | 1.3 | 100 | A | 0 |
| 7 | 3.0 | — | 330 | 1.1> | 180 | A to B | 10 |
| 8 | 1.3 | 1.3 | 400 | 1.1> | 280 | A | 0 |
| 9 | 2.0 | 1.5 | 430 | 1.1> | 270 | A | 0 |
| Com. Ex. 1 | 1.5 | — | 350 | 4 | 0 | The film was immediately dissolved, when the film was spraid with water. | |
| Com. Ex. 2 | 0 | — | 360 | 2 | 10 | A | 0 |

Notes:
*[1]Commercially available from Matsutani Kagaku Kogyo Kabushiki Kaisha
*[2]Commercially available from Oji National Kabushiki Kaisha
*[3]Commercially available from Nihon Shokuhin Kako Kabushiki Kaisha
*[4]Commercially available from Nippon Starch Chemical Co., Ltd.
*[5]Commercially available from Nippon Starch Chemical Co., Ltd.

EXAMPLES 10-18

The procedure of Example 1 was repeated except that a composition of a polyvinyl alcohol, a starch and a crosslinking agent shown in Table 2 was used instead of the composition shown in Table 1 to give a stretched film.

As to the film, the strength, ratio of swelling by water and wet strength were measured in the same manner as in Example 1. The results are shown in Table 2.

After subjecting to breaking test of the film in the same manner as in Example 1, the film state was observed and the strength of the film was measured in the same manner as in Example 1. The results are shown in Table 2.

TABLE 2

| Ex. No. | Composition | | | |
|---|---|---|---|---|
| | Polyvinyl alcohol | | Starch | Amount of PVA/Starch (by weight) |
| | Degree of Polymerization | Degree of hydrolysis (% by mole) | | |
| 10 | 1,700 | 99 | Starch urea-phosphate NYLGAMA-85 | 30/70 |
| 11 | 1,000 | 98 | Starch acetate KOFILM 80 | 40/60 |
| 12 | 1,500 | 99 | Oxidized starch Nisshoku MS-3800 | 50/50 |
| 13 | 2,000 | 99 | Corn starch | 40/60 |
| 14 | 4,000 | 97 | Starch hydroxyalkyl ether PIO starch | 10/90 |
| 15 | 1,700 | 95 | Cationic starch EXCELL A-2 | 30/70 |
| 16 | 500 | 98 | NYLGAMA-85 | 70/30 |
| 17 | 1,700 | 99 | KOFILM 80 | 50/50 |

TABLE 2-continued

| Ex. No. | | | | | | | | |
|---|---|---|---|---|---|---|---|---|
| 18 | 2,000 | | 98 | EXCELL A-2 | | | 60/40 | |

| | Composition Crosslinking agent | |
|---|---|---|
| Ex. No. | kind | Amount (%)*1 |
| 10 | Glyoxal | 2 |
| 11 | Ethyleneglycol diglycidyl ether | 5 |
| 12 | Methylol melamine | 2 |
| 13 | Glyoxal | 0.5 |
| 14 | Tolylene diisocyanate | 15 |
| 15 | Methylol melamine | 10 |
| 16 | Glyoxal | 2 |
| 17 | Ethyleneglycol diglycidyl ether | 20 |
| 18 | Aluminum chloride | 30 |

| | Stretching ratio | | | | | Film property | |
|---|---|---|---|---|---|---|---|
| Ex. No. | Machine direction | Transverse direction | Strength (kg/cm$^2$) | Ratio of swelling by water (times) | Wet strength (kg/cm$^2$) | Film state | Strength (kg/cm$^2$) after breaking test |
| 10 | 1.5 | — | 460 | 1.0> | 310 | A | 0 |
| 11 | 2.0 | — | 450 | 1.0> | 370 | A | 10 |
| 12 | 1.4 | — | 410 | 1.0> | 260 | A | 20 |
| 13 | 1.5 | — | 460 | 1.0> | 360 | A | 30 |
| 14 | 1.3 | — | 240 | 1.0> | 200 | A | 0 |
| 15 | 1.7 | — | 440 | 1.1 | 140 | A | 0 |
| 16 | 3.0 | — | 350 | 1.0> | 220 | A | 10 |
| 17 | 1.3 | 1.3 | 470 | 1.0> | 330 | A | 10 |
| 18 | 2.0 | 1.5 | 470 | 1.0> | 350 | A | 10 |

(Note)
*1Percent by weight based on the PVA and the starch

The stretched film of the present invention is excellent in water resistance and degradable property and is useful as materials suitable for agricultural uses.

In addition to the ingredients used in the Examples, other ingredients can be used in the Examples as set forth in the specification to obtain substantially the same results.

What we claim is:

1. A polyvinyl alcohol-starch film which is prepared from a composition comprising a polyvinyl alcohol having a degree of hydrolysis of at least 93% by mole and a starch, said film being at least uniaxially stretched in a stretching ratio of not less than 1.2.

2. The film of claim 1, wherein said composition further comprises a crosslinking agent.

3. The film of claim 1, wherein said starch is a modified starch.

4. The film of claim 1, wherein the weight ratio of said polyvinyl alcohol/said starch is from 75/25 to 1/99.

5. The film of claim 2, wherein the amount of said crosslinking agent is from 0.1 to 50 parts by weight based on 100 parts by weight of said polyvinyl alcohol and said starch.

6. The film of claim 1, wherein said PUA-starch film is coated with a hydrophobic resin.

* * * * *

UNITED STATES PATENT AND TRADEMARK OFFICE
CERTIFICATE OF CORRECTION

PATENT NO. : 5,106,890

DATED : April 21, 1992

INVENTOR(S) : Motokazu MARUHASHI et al

It is certified that error appears in the above-identified patent and that said Letters Patent is hereby corrected as shown below:

On the Title page, Item [75], first line, "Kasatsu" should read --Kusatsu--.

Signed and Sealed this

Twentieth Day of July, 1993

Attest:

MICHAEL K. KIRK

Attesting Officer

Acting Commissioner of Patents and Trademarks